March 27, 1956
J. J. KUESER
2,740,019
SWITCH FOR AUTOMATIC COFFEEMAKER
Original Filed April 14, 1951
2 Sheets-Sheet 2
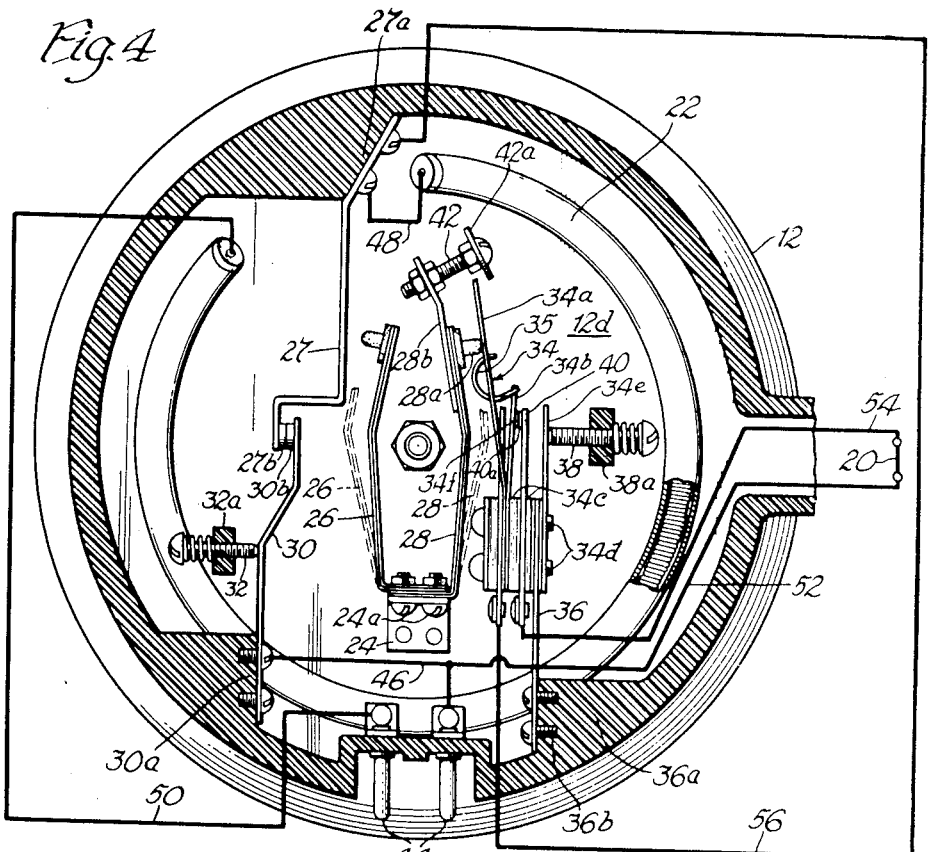
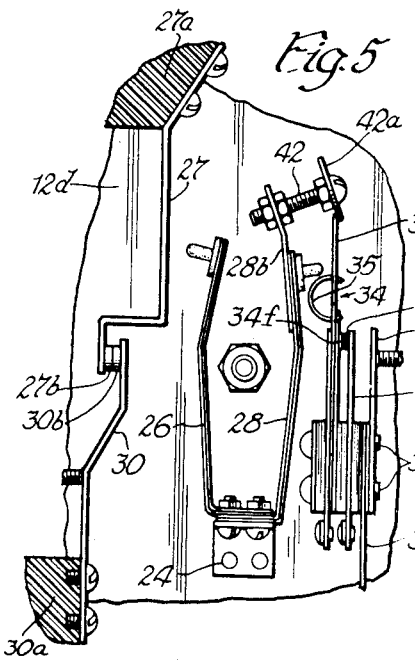
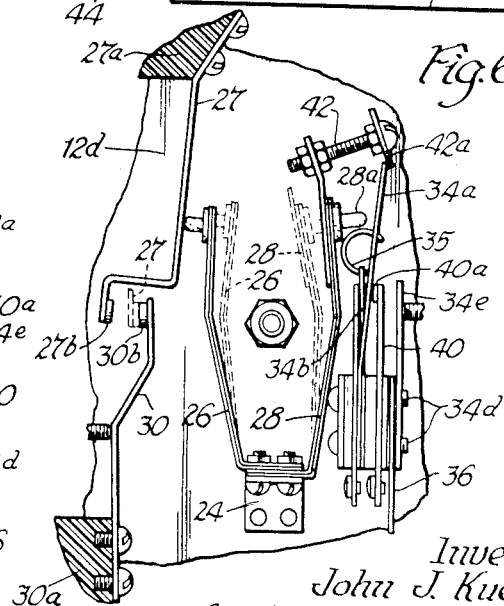
Inventor
John J. Kueser
by Bair, Freeman & Molinare
Attys.

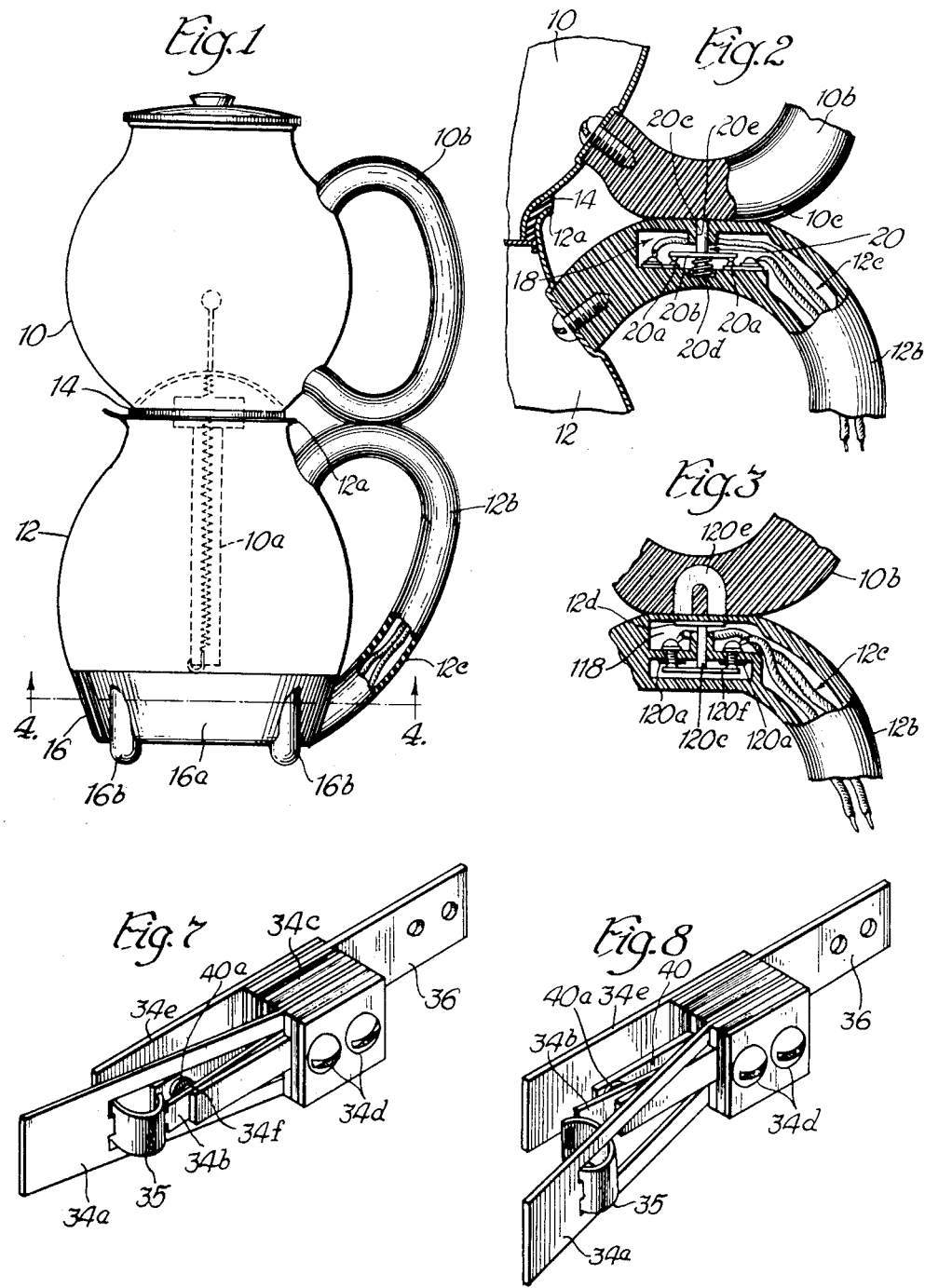

United States Patent Office 2,740,019
Patented Mar. 27, 1956

2,740,019
SWITCH FOR AUTOMATIC COFFEEMAKER

John J. Kueser, St. Louis, Mo., assignor to Knapp-Monarch Company, St. Louis, Mo., a corporation of Delaware Original application April 14, 1951, Serial No. 221,056. Divided and this application May 4, 1953, Serial No. 352,613

2 Claims. (Cl. 200—138)

My invention relates to an improved automatic switch for a coffeemaker of the vaculator type characterized by the ability to execute the coffee making cycle in a positive manner.

This application is a division of my copending patent application Ser. No. 221,056, filed April 14, 1951, entitled Automatic Coffeemaker and Switch Therefor and assigned to the same assignee as the present invention.

Coffeemakers of the vaculator type utilize a lower bowl or pot having an annular lip or surface which receives the mating gasket carried by the upper bowl to form an air tight connection. The upper bowl has a riser tube which, when the bowls are assembled, extends down into the lower bowl to a point adjacent the bottom thereof. In coffee making operations, coffee grounds are placed in the upper bowl and water in the lower bowl. The lower bowl is then heated to boil the water therein and drive it up the riser tube into the upper bowl where it extracts the essence from the coffee grounds. When the water is boiled out, or nearly so, heating is discontinued, allowing steam in the lower bowl to condense and draw the water, now containing the coffee essence, back into the lower bowl. In automatic coffeemakers it is common to provide thermostatic control means to keep the coffee infusion thus made at a warm serving temperature after its return to the lower bowl.

It is, therefore, a general object of the present invention to provide an improved automatic switch to operate a vaculator type coffeemaker.

A further object of the present invention is to provide an improved switch for a coffeemaker of the above type which snaps positively between contact-making and contact-breaking positions and has adjustable elements defining the dead band.

Another object of the present invention is to provide a simple, inexpensive, readily manufactured, positive acting switch capable of operating a coffeemaker of the above type which has a dead band of adjustable limits and is readily adjustable.

The novel features which I believe to be characteristic of my invention are set forth with particularity in the appended claims. My invention itself, however, both as to its construction and method of operation, together with further objects and advantages thereof, will best be understood by reference to the following description taken in connection with the accompanying drawings, in which:

Figure 1 is a view in elevation of a vaculator type coffeemaker incorporating a switch constructed in accordance with the present invention;

Figure 2 is an enlarged fragmentary broken-away view of the engaging handles and switch structure of the coffeemaker of Figure 1;

Figure 3 is a view like Figure 2 but of a modified form of the handles and switch structure;

Figure 4 is a cross-sectional view through axis 4—4, Figure 1, with the electrical connections shown in diagrammatic form;

Figures 5 and 6 are fragmentary bottom plan views like Figure 4 showing the switches in the positions sequentially assumed during coffee making operations; and Figures 7 and 8 are views in perspective of the wideband thermostatic switch structure of the present invention in its two positions of operation.

Referring now to Figure 1, here is shown at 10 and 12 the upper and lower bowls, respectively, of a vaculator type coffeemaker. The lower bowl has an outwardly extending flared lip portion, indicated at 12a, defining an annular seat which receives the rubber gasket 14 secured to the upper bowl 10 to define a tight seal in the assembled condition. The riser tube 10a, formed as part of the upper bowl, extends down through this seal as shown.

The lower bowl 12 is received upon and attached to the stand 16 which defines a protective electrically insulating skirt 16a and a plurality of heat insulating support legs 16b. This stand forms an enclosure for the heater and thermostatic operating elements described hereafter.

The upper bowl 10 may be handled and detached from the lower bowl by the use of handle 10b which is of Bakelite (phenol-formaldehyde condensation product) or similar heating insulating material. A handle 12b of like material permits lifting the lower bowl 12 and pouring coffee therefrom. A suitable spout or pouring lip (not shown) is provided on the lip 12a to facilitate pouring.

In accordance with one form of the present invention, the handle 12b of the lower bowl has a cavity 18, Figure 2, at its upper portion immediately below the lowermost reach 10c of the handle 10b of upper bowl 10. This cavity contains the detent operated normally open switch indicated generally at 20. This switch consists of a pair of spaced contact elements 20a fixedly supported by the handle 12b. These elements coact with the resilient conducting disk 20b carried by detent 20c to establish a circuit connection when that detent is forced downwardly by engagement with handle 10b as shown in Figure 2. When the detent is released, it lifts under the bias of spring 20d to separate disk 20b and the contacts 20a and thereby break the circuit. The detent 20c is held in the handle 12b for shifting up and down movements by the bearing opening 20e and is held against removal from the cavity 18 by the disk 20b which abuts the bottom face of the bearing sleeve 20e when the detent is released.

Preferably the handle 12b has an arcuate bore 12c to receive the connecting wires extending from the stand 16 to the switch 20 to define the electric circuits described hereafter.

The temperature responsive control switch mechanism is best seen in the cross-sectional view of Figure 4 which shows the bottom 12d of the lower bowl 12. As shown, a nearly circular heating element 22 is secured to the bottom 12d by soldering or other suitable means for intimate thermal relation therewith. The heating element may, for example, consist of a tube of copper or brass containing an argillaceous fill carrying a heater coil of resistance wire having length and cross-section capable of producing the required heat for coffee making when connected to the usual domestic electric supply. Such elements are well known in the art and form no part of the present invention.

The bottom 12d also carries a heat conducting support bracket 24, likewise soldered or otherwise secured in position for intimate heat contact. This bracket extends downwardly from the bottom and receives the screws 24a which anchor the two bimetallic blades, 26 and 28, to the conducting bracket 24 so that these blades partake of and respond to the temperature of the lower bowl 12. When heated, these blades flex outwardly from the center of the bottom 12d to positions such as shown in the dotted lines, Figure 4.

The blade 26 coacts with the resilient switch arm 27 to form a narrow-band on-off switch to maintain the lower bowl at a preset keep-warm temperature. To this end, arm 27 is carried by the bracket 27a formed by the skirt portion of stand 16 in position to be engaged by the bimetallic blade 26. At its free end the arm 27 carries contact button 27b which, when arm 27 is released, bottoms against the corresponding contact button 30b of arm 30 to establish a circuit connection. Arm 30 is resilient and is supported from the base of stand 16 by the bracket 30a.

The position of arm 30 is adjustably fixed by the set screw 32 which is threadedly received by the bracket 32a of the base 16. This screw fixes the position of the bimetallic blade 26 at which the contact buttons 27b and 30b touch and thereby establishes the temperature value maintained by the thermostatic switch defined by blade 26 and arms 27 and 30.

The thermostatic blade 28 forms the actuating element of the wide band coffee making thermostatic switch indicated generally at 34 and shown in perspective view in Figures 7 and 8. This switch includes a pair of resilient blades 34a and 34b held in sandwiched position by the insulating spacers 34c which in turn are pressed against each other by the screws 34d. The support arm 36 is also sandwiched between the spacers 34c and at its remote end is attached to and supported by the bracket portion 36a of the base 16. This attachment is achieved by the screws 36b which are threadedly received by the bracket portion 36a.

The screws 34d are threadedly received by the blade 34e which extends outboard of spacers 34c to be engaged by set screw 38 as is described in further detail hereafter.

A compression spring 35, which may, for example, be a U-shaped leaf spring, bottoms at its opposite ends on the arms 34a and 34b as shown. Since this spring urges these arms to opposed flexed positions (except in the practically unimportant dead center position), the arms 34a and 34b are positively driven to opposed flexed positions. Arm 34b is provided with a contact button 34f which engages the contact button 40a of the relatively inflexible arm 40 to establish a circuit connection when arms 34a and 34b are in the positions shown in Figure 4 and to break that connection when the arms are in the opposed position.

The arm 34a extends outboard of arm 34b to form a face against which the insulating button 28a of blade 28 bears. As the blade 28 is heated to flex towards the right as seen in Figure 4, the button 28a bears against arm 34a until the latter is driven over dead center, at which time the arms 34a and 34b are driven to the opposite overcenter or flexed positions to break contact between buttons 34f and 40a.

An extension or outrigger 28b is also carried by the blade 28 and threadedly receives the screw 42 which has an insulating washer 42a carried by its head portion. This washer is of sufficient diameter to overlay the path of travel of the outer reaches of the arm 34a as shown, thus straddling arm 34a in conjunction with button 28a. The washer 42a engages the blade 34a to force it back over center to restore the positions of Figure 4 when the bimetal 28 has cooled sufficiently to exert the torque requisite for this purpose.

The set screw 38 is threadedly carried by a bracket 38a in the base 16.

The heater 22 is energized from the appliance cord terminals 44 through either of two circuits. One circuit, the keep warm circuit, may be traced directly to the heater through the contact buttons 27b and 30b, this circuit passing through conductors 46, 48, and 50. The other circuit, the coffee making circuit, may be traced to the heater through the switch 20 and the contact buttons 34f and 40a in series, this circuit passing through conductors 52, 54, 56, 48, and 50.

*Operation*

Having described the structure of the present invention, I will now describe its operation with particular reference to the diagrams of Figures 4 to 8.

When coffee is to be made, the lower bowl 12 is filled with the required amount of water, the upper bowl 10 placed in position, and the necessary coffee placed in the upper bowl, a suitable strainer being provided to hold the coffee grounds against passage through the riser tube 10a. The switch elements then have the positions of Figure 4 for the switch 20 is closed by the presence of the upper bowl 10 and the bimetallic blades 26 and 28 being in the low temperature positions where contacts 34f—40a and 27b—30b are closed.

When the appliance cord is then plugged in, the heater 22 is energized through both contacts 34f—40a and 27b—30b and the lower bowl 12 accordingly heated. As this heating continues, the lower bowl 12 rises to a temperature above the keep warm temperature (which may, for example, be 180° F.) at which time the contacts 27b—30b separate. This does not alter the heater operation since the circuit through contacts 34f—40a remains established.

As the heating continues further, the temperature in the lower bowl 12 rises to boiling temperature and remains at that value until nearly all the water is driven to the upper bowl where it comes into contact with the coffee grounds and removes the essence therefrom to make the coffee infusion. The temperature of the bottom of the lower bowl rises as the water is driven from it, thus causing the bimetal blade 28 to flex to the position of Figure 6, where it drives the arm 34a over center to cause spring 35 to swing arms 34a and 34b to the opposite positions of flexure as shown in Figure 6. Contact button 34f accordingly swings to spaced position in relation to button 40a, thus interrupting the energizing circuit to heater 22.

When power to the heater 22 is interrupted by the action of the arms 34a and 34b as they swing over center, the lower bowl 12 cools and the steam therein condenses to create a vacuum drawing the coffee infusion back into the lower bowl. The cooling thereafter continues until eventually the keep warm temperature (say 190° F.) is reached and the bimetallic blade 26 relaxes sufficiently to relieve arm 27 to permit engagement of contacts 27b and 30b as shown by the dotted lines of Figure 6. The heater is then intermittently energized under the control of the thermostatic switch formed by arms 27 and 30 and by the bimetallic blade 26 to maintain the brew at the selected keep warm temperature.

The thermostatic switch 34 remains in the open circuit position of Figure 6 while the lower bowl 12 is at the keep warm temperature because the bimetallic blade 28 at this temperature does not move sufficiently to cause the disk 42a to drive arm 34a back over dead center. This condition is shown in Figure 5.

In the ordinary and usual coffee making operation, the upper bowl 10 is removed when the brew returns to the lower bowl 12 and the coffee is poured from the lower bowl either immediately or within a reasonably short time. The conditions described above accordingly continue until the coffee is consumed. However, if the coffee is not to be consumed for some time, the appliance cord connected to prongs 44 may be disconnected for reasons of economy and safety, thereby deenergizing the unit completely and permitting the lower bowl 12 to cool below the keep warm temperature to a lower value and eventually to room temperature. When the temperature falls to a value of, say 135° F., the bimetallic blade 28 unflexes sufficiently to force the arm 34a over center, thus causing arms 34a and 34b to reverse positions to the initial positions shown at Figure 4. Even in this condition, however, the circuit through the contacts 34f—40a to the heater 22 is interrupted by switch 20 which is open because the upper bowl 10 is removed. Consequently, the heater 22 is operated only under the control of bimetal 26 to maintain the keep warm temperature when the appliance cord is again connected. There is accordingly no tendency of the unit to recycle under the high heat or coffee making control of bimetal 28.

It will be noted that the thermostat switch defined by blade 28, arms 34a and 34b, and the spring 35 is a wide band thermostatic switch in that the temperature range between the high temperature at which it changes to the off position and the lower temperature at which it restores the on position is relatively large. For example, in a practical coffee maker this switch may open the circuit at 220° F. and subsequently reclose the circuit at 135° F., the former temperature being indicative of the fact that the water is substantially expelled from the lower bowl 12 and the latter being below the keep warm temperature but above room temperature.

The value of the high temperature at which the bimetal 28 moves arms 34a and 34b to the off position is determined by the adjustment of the set screw 38a which fixes the position of the blade 28 corresponding to dead center of the arm 34a. The value of the low temperature at which the bimetal 28 restores arms 34a and 34b to their low temperature positions is determined by the adjustment of set screw 42 which controls the position of the blade 28 at which the arm 34a is driven to dead center by engagement with the disk 42a.

The thermostatic switch defined by bimetallic blade 26 and arms 27 and 30 is a narrow band thermostatic switch having the smallest temperature difference between the on and off position consistent with economic construction, reliability, and reasonably low cycling frequency in order to maintain the brew at as nearly constant temperature as possible. The value of the temperature so regulated is determined by the adjustment of set screw 32.

Figure 3 is a view like Figure 2 showing an alternative form of the switch 20 utilizing magnetic attraction for actuation. In this structure the handle 12b has a cavity 118 in which are disposed the fixed contacts 120a and the magnetic armature 120d, the latter connected by post 120c to the conducting disk 120f which engages contacts 120a when the armature 120d is in the up position. The armature 120d registers with a permanent magnet 120e mounted in the handle 10b of the upper bowl 10 so that when the upper bowl is in position, the armature is lifted and the circuit across contacts 120a established. When the upper bowl is not in position, the armature is no longer attracted and drops to break the circuit.

It will be observed that the structure of Figure 4 is like that of Figure 2 in that it forms a normally open switch that senses the fact that the upper bowl is in position and then closes. Moreover, like the structure of Figure 2, it does not interfere with the seal between the bowls 10 and 12 achieved by the gasket 14.

Figures 7 and 8 are perspective views of the wide-band switch unit. As shown, blade 34a has an elongated opening in which the blade 34b fits so as to avoid interference and the spring 35 is rockably anchored to these arms by end openings which receive protuberances on the blades.

While I have shown a specific embodiment of my invention, it will, of course, be understood that other structures may be used without departing from the true spirit and scope thereof. I, therefore, intend by the appended claims to cover all modifications and alternative constructions falling within their true spirit and scope.

What I claim as new and desire to secure by Letters Patent of the United States is:

1. A wide band thermostatic switch operable to switch positively from first condition to a second condition at a predetermined pickup temperature and to switch positively to the first condition at a predetermined substantially different drop-out temperature, the switch comprising a pair of resilient arms mounted for coplanar relation when unflexed, an over-center compression spring anchored at its opposite ends to the arms respectively to drive them to opposed over-center positions of flexure, a bimetallic blade mounted in spaced relation to the arms for movement in essentially the same directions as the arms in response to temperature, the bimetallic blade having straddling elements operable to engage opposite sides of one of said arms to form a lost motion connection thereto, the spacing of said elements being adjustable to determine the dead band of the switch, and fixed contacts operable to engage one of the arms when in the flexed position.

2. A wide band thermostatic switch operable to switch positively from first condition to a second condition at a predetermined pickup temperature and to switch positively to the first condition at a predetermined substantially different drop-out temperature, the switch comprising a pair of resilient arms mounted for coplanar relation when unflexed, an over-center compression spring anchored at its opposite ends to the arms respectively to drive them to opposed over-center positions of flexure, a bimetallic blade mounted in spaced relation to the arms for movement in essentially the same directions as the arms in response to temperature, the bimetallic blade having straddling elements operable to engage opposite sides of one of said arms to form a lost motion connection thereto, the spacing of said elements being adjustable to determine the dead band of the switch, fixed contacts operable to engage one of the arms when in the flexed position, and means operable to move the arms in unison and in relation to the bimetallic blade to control the value of the pickup temperature.

References Cited in the file of this patent

UNITED STATES PATENTS

| | | |
|---|---|---|
| 2,200,852 | Pond | May 14, 1940 |
| 2,558,219 | Kohl | June 26, 1951 |